United States Patent
Bruno et al.

(10) Patent No.: US 9,957,051 B2
(45) Date of Patent: May 1, 2018

(54) METHOD OF OPERATING A MULTI-PACK ENVIRONMENTAL CONTROL SYSTEM

(71) Applicant: Hamilton Sundstrand Corporation, Windsor Locks, CT (US)

(72) Inventors: Louis J Bruno, Ellington, CT (US); Thomas M. Zywiak, Suffield, CT (US); Diane G. Drew, Windsor, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 732 days.

(21) Appl. No.: 14/088,549

(22) Filed: Nov. 25, 2013

(65) Prior Publication Data

US 2015/0059397 A1    Mar. 5, 2015

Related U.S. Application Data

(60) Provisional application No. 61/872,988, filed on Sep. 3, 2013.

(51) Int. Cl.
| | |
|---|---|
| *F25D 9/00* | (2006.01) |
| *F28B 9/00* | (2006.01) |
| *B64D 13/06* | (2006.01) |

(52) U.S. Cl.
CPC ...... *B64D 13/06* (2013.01); *B64D 2013/0614* (2013.01); *Y02T 50/56* (2013.01)

(58) Field of Classification Search
CPC ............ B64D 13/06; B64D 2013/0603; B64D 2013/0614; B64D 2013/0618; B64D 2013/064; B64D 2013/0648; Y02T 50/56; F25B 9/004; F25B 9/06; F25B 9/065; F25B 11/02

USPC .......................................... 62/402, 172, 401
See application file for complete search history.

(56) References Cited

U.S. PATENT DOCUMENTS

| | | | | |
|---|---|---|---|---|
| 5,461,882 | A | * 10/1995 | Zywiak | B60H 1/00007 |
| | | | | 62/401 |
| 6,058,725 | A | 5/2000 | Monfraix et al. | |
| 6,148,622 | A | * 11/2000 | Sanger | B64D 13/06 |
| | | | | 62/402 |

(Continued)

FOREIGN PATENT DOCUMENTS

WO   WO 2005030583 A1 * 4/2005 ............. B64D 13/00

OTHER PUBLICATIONS

European Search Report for EP 14 18 2609; dated Feb. 11, 2015; 6 pages.

*Primary Examiner* — Frantz Jules
*Assistant Examiner* — Joseph Trpisovsky
(74) *Attorney, Agent, or Firm* — Cantor Colburn LLP

(57) ABSTRACT

An environmental control system (ECS) pack is provided including a primary heat exchanger, a secondary heat exchanger, and an air cycle machine. The air cycle machine includes a compressor and a turbine. The compressor is fluidly coupled to an outlet of the primary heat exchanger and to an inlet of the secondary heat exchanger. The outlet of the secondary heat exchanger is fluidly coupled to the turbine. A first conduit connects the outlet of the primary heat exchanger and the inlet of the secondary heat exchanger. The first conduit includes a first valve. A second conduit connects the outlet of the secondary heat exchanger to an air load. The second conduit includes a second valve.

14 Claims, 5 Drawing Sheets

(56) References Cited

U.S. PATENT DOCUMENTS

| | | |
|---|---|---|
| 6,381,969 B1 | 5/2002 | Afeiche et al. |
| 7,536,865 B2 | 5/2009 | Mikhail |
| 8,033,118 B2 | 10/2011 | Monteiro et al. |
| 8,397,487 B2 | 3/2013 | Sennoun et al. |
| 2004/0129835 A1* | 7/2004 | Atkey .................... B64D 13/06 244/118.5 |
| 2004/0172963 A1 | 9/2004 | Axe et al. |
| 2007/0113579 A1 | 5/2007 | Claeys et al. |

\* cited by examiner

METHOD OF OPERATING A MULTI-PACK ENVIRONMENTAL CONTROL SYSTEM

CROSS-REFERENCE TO RELATED APPLICATIONS

This application claims the benefit of U.S. Provisional Patent Application Ser. No. 61/872,988, filed on Sep. 3, 2013, the entire contents of which are herein incorporated by reference.

BACKGROUND OF THE INVENTION

Embodiments of the invention relate to aircraft environmental control systems, and more particularly, to a gas turbine engine compressor air supply of an aircraft environmental control system.

In a typical gas turbine engine, a compressor compresses air and passes that air along a primary flow path to a combustor where it is mixed with fuel and combusted. The combusted mixture expands and is passed to a turbine, which is forced to rotate due to the passing combusted mixture. When used on an aircraft, the primary purpose of this system is to provide propulsive force for the aircraft.

In some gas turbine engines, a portion of the air compressed by the compressor is diverted from the primary flow path to a bleed inlet of a bleed air system. This compressed bleed air can be used for a variety of purposes, such as to de-ice a wing or to provide pressurized air to a cabin of the aircraft. Because the bleed air is often at an undesirably high temperature, a heat exchanger is used to cool the bleed air. Bleeding off and cooling compressed air typically does not generate thrust, thus reducing the efficiency of the compressor and the entire gas turbine engine. Moreover, the heat exchanger takes up a relatively large amount of space and can increase the overall weight of the bleed air system.

BRIEF DESCRIPTION OF THE INVENTION

According to one embodiment of the invention, an environmental control system (ECS) pack is provided including a primary heat exchanger, a secondary heat exchanger, an air cycle machine, and an optional means of removing moisture from the air, such as a condensing heat exchanger. The air cycle machine includes a compressor and a turbine. The compressor is fluidly coupled to an outlet of the primary heat exchanger and to an inlet of the secondary heat exchanger. The condensing heat exchanger may be fluidly coupled to an outlet of the secondary heat exchanger. A first conduit, including a first valve, connects the outlet of the primary heat exchanger to the inlet of the secondary heat exchanger and to the turbine. A second conduit, including a second valve, connects the outlet of the secondary heat exchanger to an air load According to another embodiment of the invention, an aircraft is provided including an engine and at least two environmental control system packs. Each environmental control system pack is configurable to operate in at least two operating modes. A controller is configured to command the at least two environmental control system packs to operate in one of the at least two operating modes.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
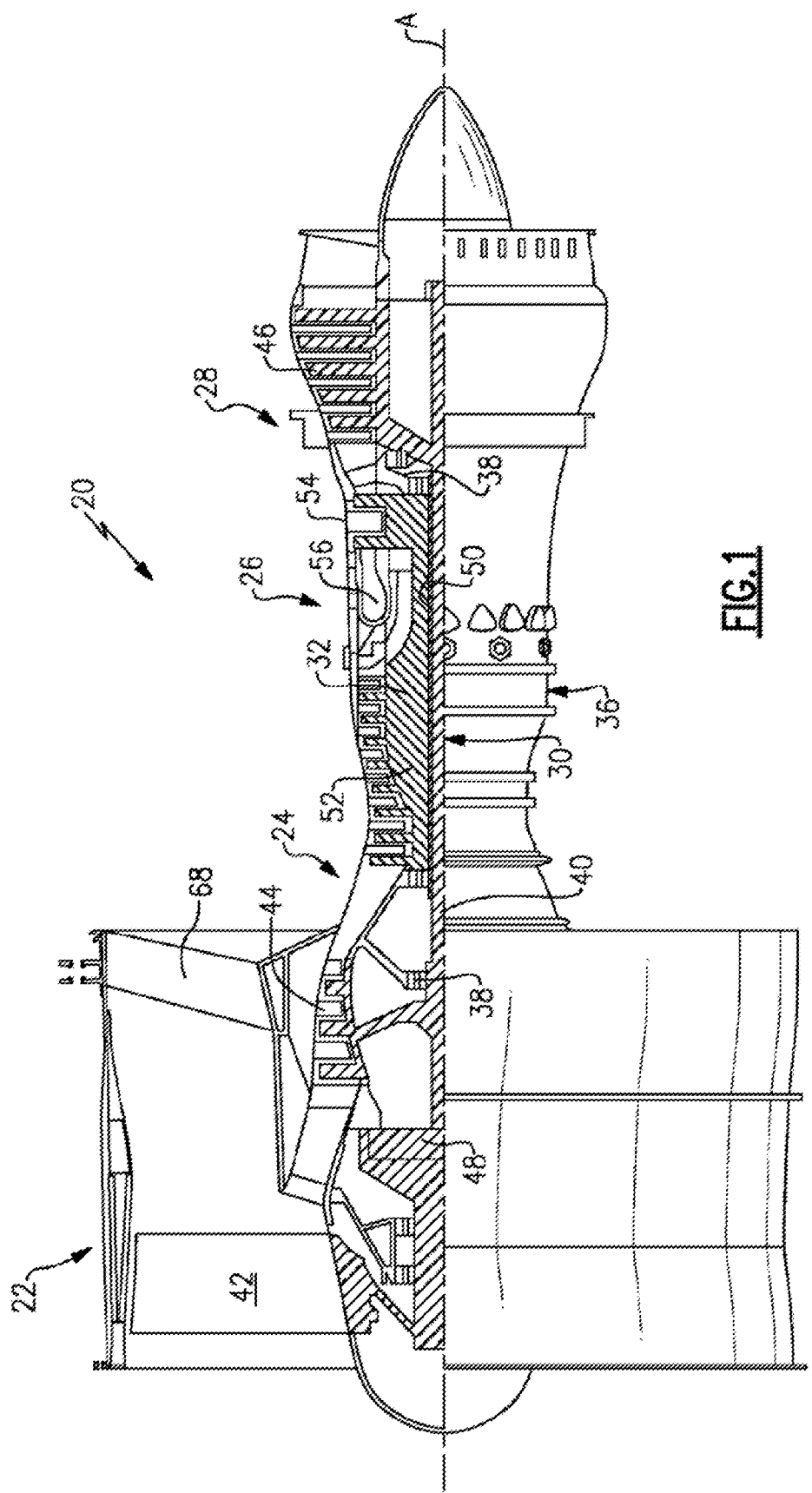
FIG. 1 is a cross-sectional view of a gas turbine engine of an aircraft.
Figure 2:
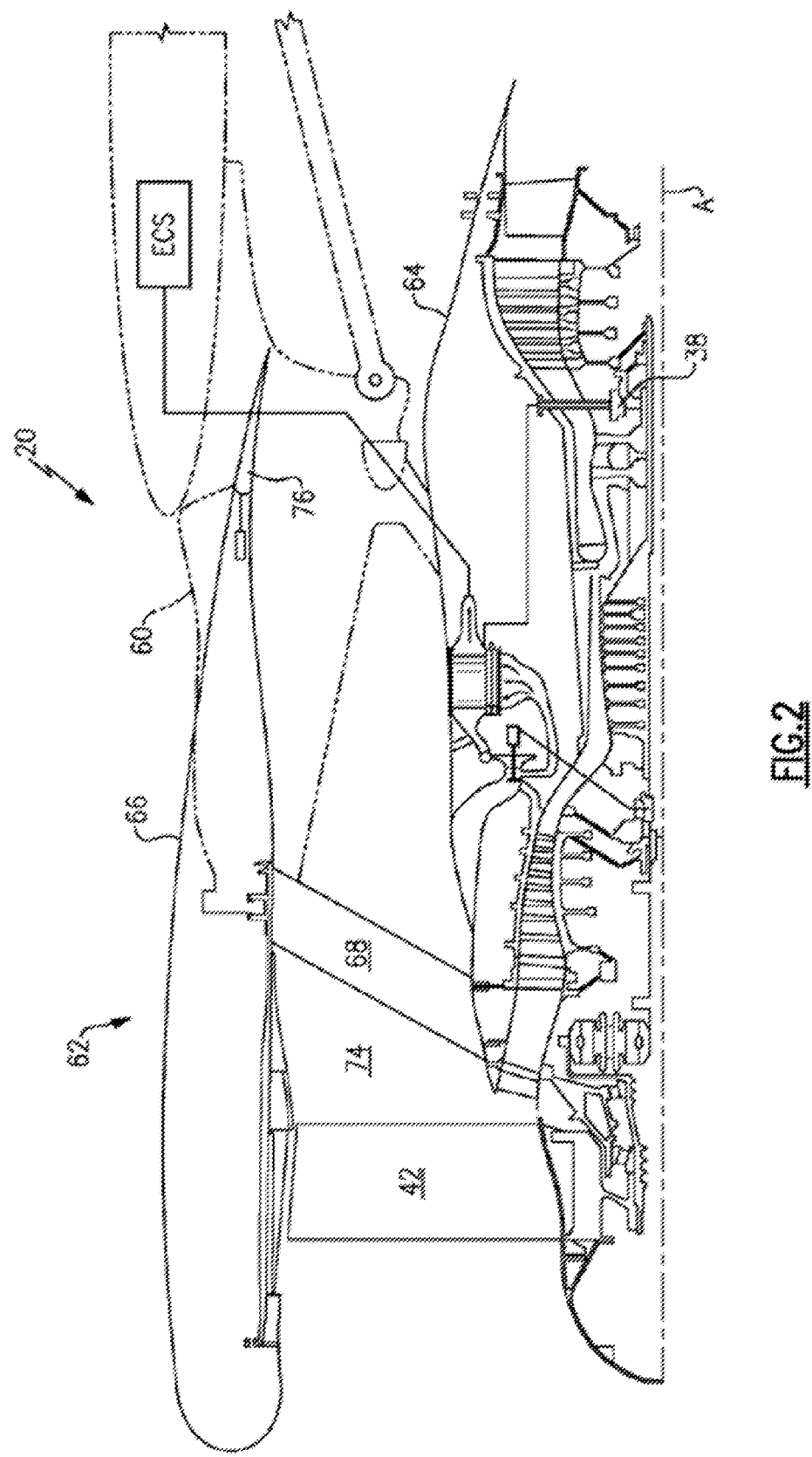
FIG. 2 is another cross-sectional view of a gas turbine engine within the nacelle assembly.

Referring now to FIGS. 1 and 2, an example of a gas turbine engine 20 configured for use in an aircraft is illustrated schematically. The gas turbine engine 20 disclosed herein is a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path while the compressor section 24 drives air along a core flow path for compression and communication into the combustor section 26 and then expansion through the turbine section 28. Although depicted as a turbofan gas turbine engine 10 in the disclosed non-limiting embodiment, it should be understood that the concepts described herein are not limited to use with turbofans as the teachings may be applied to other types of turbine engines, such as three-spool architectures for example.

The engine 20 generally includes a low spool 30 and a high spool 32 mounted for rotation about an engine central longitudinal axis A relative to an engine static structure 36 via several bearing systems 38. It should be understood that various bearing systems 38 at various locations may alternatively or additionally be provided.

The low spool 30 generally includes an inner shaft 40 that interconnects a fan 42, a low pressure compressor 44, and a low pressure turbine 46. The inner shaft 40 may be connected to the fan 42 directly or through a geared architecture 48 to drive the fan 42 at a different, typically lower, speed than the low spool 30. The high spool 32 includes an outer shaft 50 that interconnects a high pressure compressor 52 and a high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 56 and low pressure turbine 46. The turbines 54, 46 rotationally drive the respective low spool 30 and high spool 32 in response to the expansion.

With reference to FIG. 2, the gas turbine engine 20 is mounted to an engine pylon structure 60 within an engine nacelle assembly 62 as is typical of an aircraft designed for subsonic operation. The nacelle assembly 62 generally includes a core nacelle 64 and a fan nacelle 66. It should be appreciated that the core nacelle 64 and the fan nacelle 66 may be of various configurations.

Figure 3:
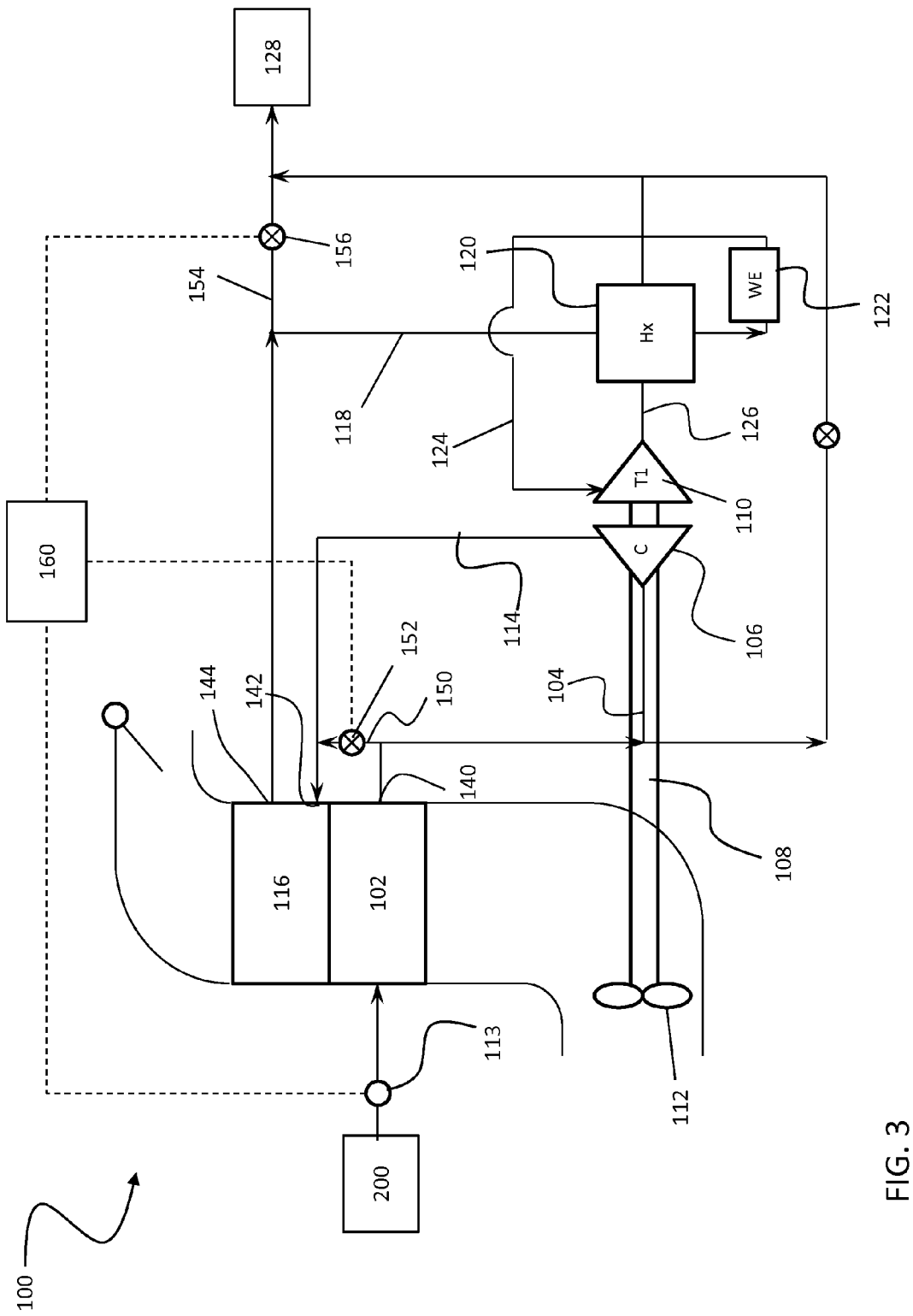
FIG. 3 is a schematic diagram of an ECS pack of an environmental control system (ECS) of an aircraft.
Figure 4:
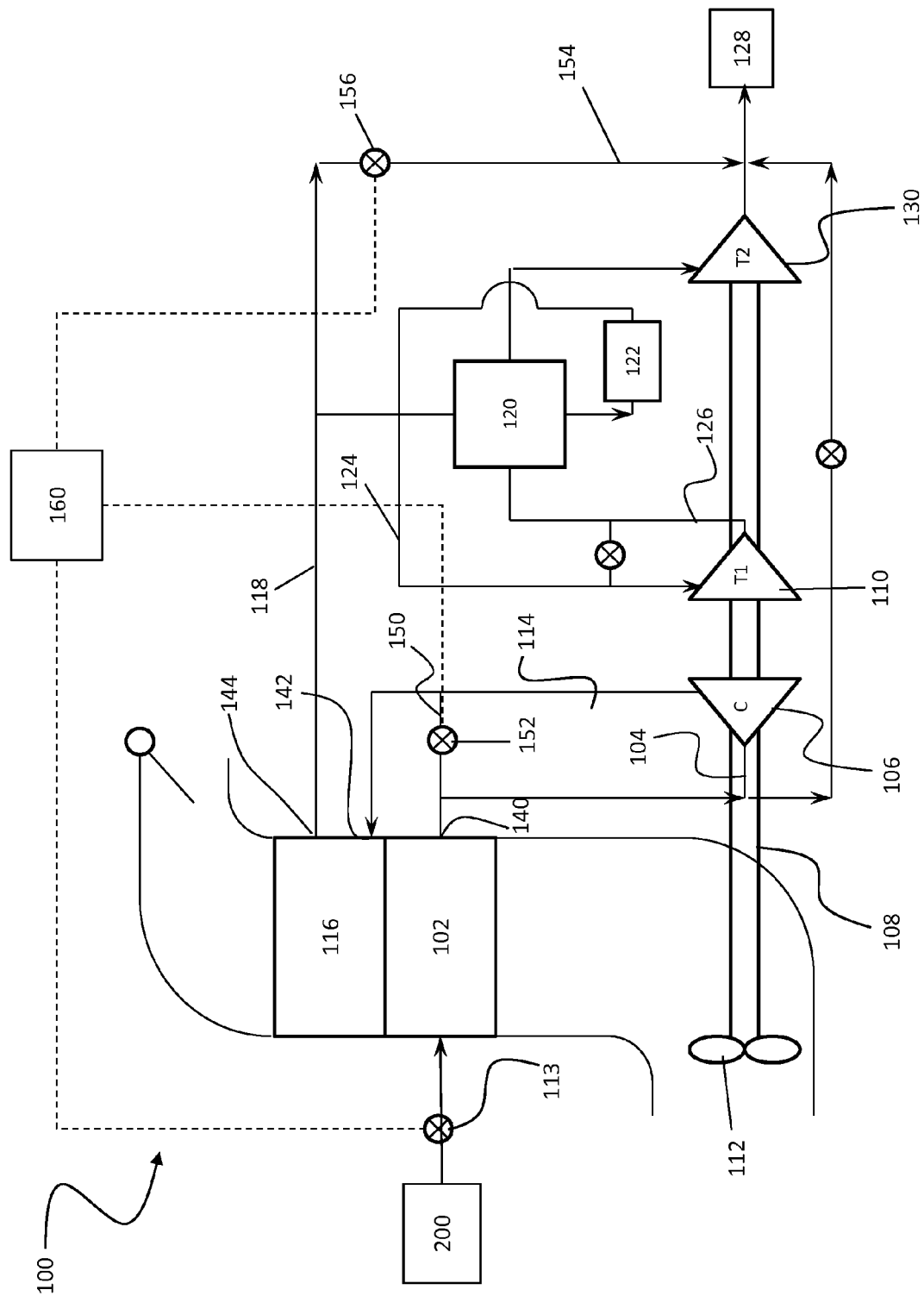
FIG. 4 is a schematic diagram of another ECS pack of an environmental control system (ECS) of an aircraft.
Figure 5:
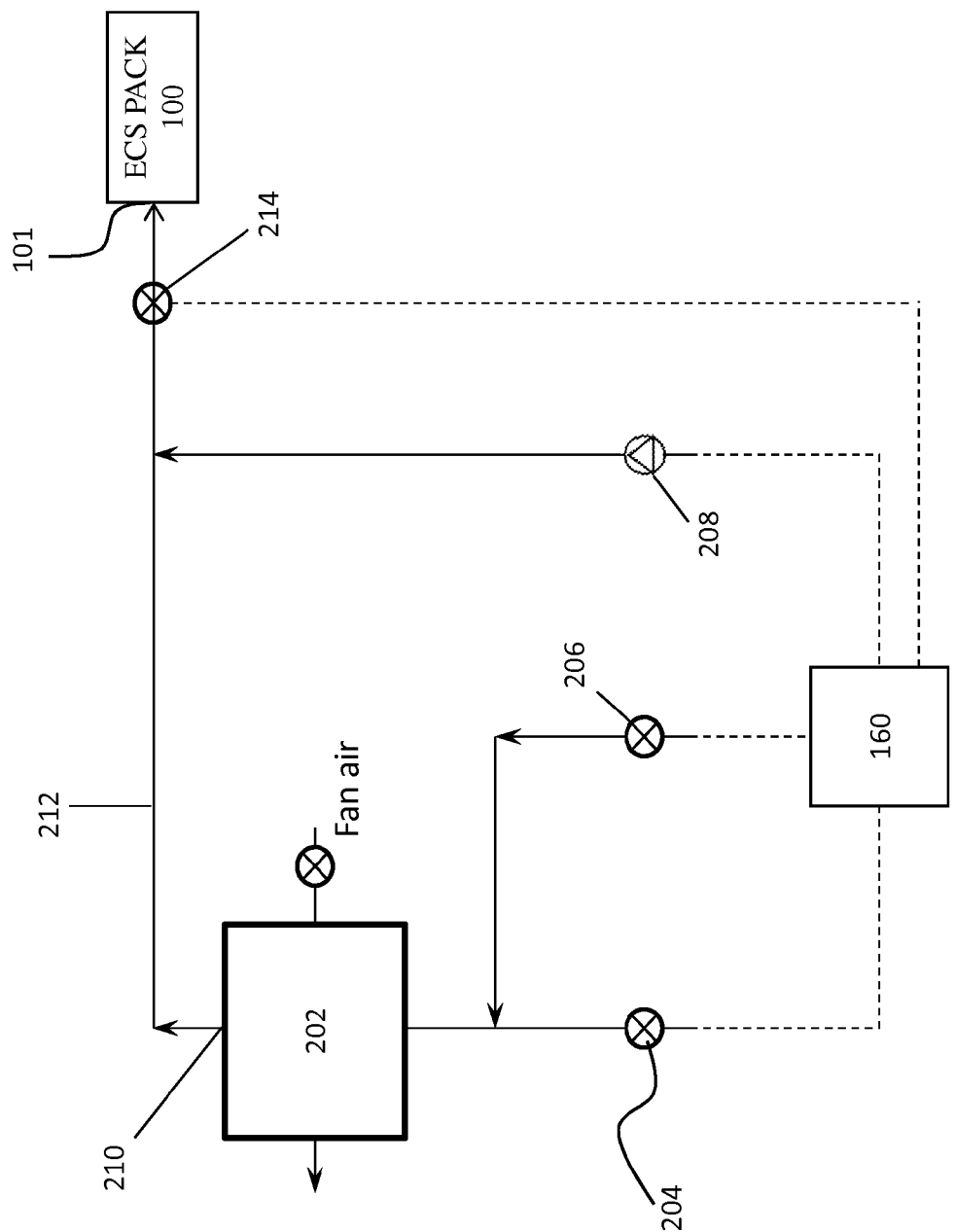
FIG. 5 is a schematic diagram of a bleed air supply system fluidly coupling a gas turbine engine and an ECS pack of an aircraft.

Referring now to FIGS. 3 and 4, each pack 100 of an environmental control system (ECS) of the aircraft is supplied with compressor bleed air from one of the gas turbine engines 20 by a compressor bleed air supply system 200 (see FIG. 5). The ECS may include any number of ECS packs 100 configured to supply conditioned air to various heat loads of the aircraft. Bleed air from the supply system 200 is input to a primary heat exchanger 102 such that the bleed air is in a heat exchange relationship with ram or ambient air. The amount of ram or ambient air provided to both the primary heat exchanger 102 and a secondary heat exchanger 116 is controlled by a variable inlet 113. After the bleed air is cooled in the primary heat exchanger 102, the resulting cooler air is communicated through a passage 104 to a compressor 106, where the bleed air is compressed to a high pressure. The compressor 106 may be located on a common shaft 108 with a first turbine 110 and a fan 112. Together the fan 112, compressor 106, and first turbine 110 define an air cycle machine (ACM).

Compressed air exits the compressor 106 through a passage 114 and is provided to a secondary heat exchanger 116 configured to further cool the compressed air by heat exchange with a ram air or ambient air flow. Compressed, cooled air bearing water vapor exits from the secondary heat exchanger 116 and flows through a duct 118 to a condensing heat exchanger 120. The condensing heat exchanger 120 is configured to further cool the air by condensing and separating the water into a water extractor 122. Dehumidified air exits the water extractor 122 and is provided, through a passage 124, to a first turbine 110. The bleed air is expanded and water vapor in the air is further condensed through the first turbine 110 of the ACM. The cooled air flows through a passage 126 back to the condensing heat exchanger 120, where the air is heated to a relatively warmed temperature, and is then supplied to the air loads (illustrated schematically at 128) of the aircraft, such as to the cabin for example.

The ECS pack 100 illustrated in FIG. 4, includes a second turbine 130 arranged on the shaft 108 of the fan 112, compressor 106, and first turbine 110. After the bleed flow exits from a second pass 126 through the condensing heat exchanger 120, the bleed air is provided to the second turbine 130, where the air is further expanded, before being provided to the air loads 128 of the aircraft. In one embodiment, a reheater (not shown) configured to further cool the bleed air may be arranged between the secondary heat exchanger 116 and the condensing heat exchanger 120. The three wheel (FIG. 3) and four wheel (FIG. 4) ACM ECS packs 100 described herein are for illustrative purposes only, and an ECS pack 100 having an ACM of another configuration is within the scope of the invention.

Referring again to the ECS packs 100 illustrated in FIGS. 3 and 4, a first conduit 150 including a first valve 152 connects the outlet 140 of the primary heat exchanger 102 to the inlet 142 of the secondary heat exchanger 116. A second conduit 154 including a second valve 156 extends from outlet 144 of the secondary heat exchanger 116 to the plurality of air loads 128 of the aircraft. The first and second valve 152, 156 may be any type of valve, including but not limited to a check valve, ball valve, and butterfly valve for example. The first valve and the second valve are operably coupled to a controller 160 configured to move each of the valves between a first closed position and a second open position. Controller 160 may be coupled to variable inlet 113 to control the flow of ambient or ram air through the primary and secondary heat exchangers 102 and 116.

Each ECS pack 100 is configured to operate in a first normal mode and a second bypass mode. When the ECS pack 100 is in the first normal mode, the first valve 152 and the second valve 156 are closed such that the bleed air flows through the ACM in a conventional manner. When the ECS pack 100 is in the second, bypass mode, both the first valve 152 and the second valve 156 are at least partially open. When the first valve 152 is open, the majority of the bleed air will flow from the primary heat exchanger 102 directly to the secondary heat exchanger 116; however, a small portion of the bleed air will flow through the compressor 106. When the second valve 156 is open, the majority of the bleed air flows from the secondary heat exchanger 116 directly to the air loads 128 of the aircraft and only a small portion of the bleed air is provided to the turbine 110. The small amount of air provided to the turbine 110 via the second valve 156 allows for rotation of the ACM at a minimal operational speed to prevent failure thereof. In one embodiment, the air flow to the turbine 110 is controlled by the location of the second valve 156 within the ECS pack 100 and also by the flow rate of bleed air through the second valve 156.

The compressor bleed air supply system 200 configured to supply air from the gas turbine engine 20 to an ECS pack 100 is illustrated in more detail in FIG. 5. The compressor bleed air supply system 200 includes a precooler 202 which may be used to cool the compressor bleed air before it is provided to the ECS pack 100. The precooler 202 includes an air to air heat exchanger in fluid communication with a source of cooling air, such as the bypass air flow in the bypass flow path 74 for example.

The compressor bleed air supply system 200 includes a high pressure port 204, and intermediate pressure port 206, and a low pressure port 208, configured to bleed air from various portions of an engine 20. The high pressure port 204 is configured to bleed air from the high spool 32 of the engine 20 and the low pressure port 208 is configured to bleed air from a low spool 30 of the engine 20, such as from the high pressure compressor 52 and the low pressure compressor 44, respectively, for example. The intermediate pressure port 206 is configured to bleed air from a portion of the engine 20 having a pressure generally greater than the air at the low pressure port 208 and lower than the air at the high pressure port 204. In one embodiment, the intermediate pressure port 206 is also configured to bleed air from a portion of the high pressure compressor 52.

A valve at each port 204, 206, 208 is operably coupled to a controller 160. The controller 160 may be the same controller configured to operate the plurality of valves 152, 156 of the ECS packs 100, or alternatively, may be different. The controller 160 is configured to operate the valves that control the flow of bleed air into each of the ports 204, 206, 208. In one embodiment, only one of the high pressure port 204, intermediate pressure port 206, and low pressure port 208 of a compressor bleed air supply system 200 is open at any given time. It should be understood that various types of valves and control strategies may be used, including check valves that are controlled indirectly by pressure changes in the system as a result of opening or closing other valves in the bleed air supply system.

Under certain flight conditions, when the temperature and pressure of the ambient air combined with the power setting of the turbine engine 20 result in the temperature of the bleed air at the low pressure port 208 exceeding a predefined threshold, such as 450° F. for example, the controller 160 opens both the intermediate pressure port 206 and the low pressure port 208. The bleed air from the intermediate pressure port 206, cooled by the precooler 202, is mixed with the warmer bleed air from the low pressure port 208 to generate a resultant air mixture having a temperature below the predefined threshold. In order to reduce the total amount of efficiency lost in the turbine engine 20 the amount of cool air from the intermediate pressure port 208 provided is the minimum required to achieve a temperature of the resultant air mixture below the predefined threshold.

Under other flight conditions, for example during idle decent, the energy available at the low pressure port 208 is insufficient to power the ECS pack 100, even when combined with the energy available at intermediate port 206. Under these flight conditions controller 160 will cause bleed air system 200 to draw bleed air from high pressure port 204 to provide the needed energy to power the ECS pack 100.

The high pressure port 204 and the intermediate pressure port 206 are both fluidly coupled to the precooler 202 such that bleed air drawn through either port 204, 206 first passes through the precooler 202 before being provided to an ECS pack 100. The low pressure port 208 is fluidly coupled to a conduit 212 extending from the outlet 210 of the precooler 202 to the ECS pack 100. Because the bleed air supplied at the low pressure port 208 is generally cooler than the air from the intermediate or high pressure port 204, 206, the low pressure bleed air does not need to be cooled before being supplied to the ECS pack 100. As a result, air from the low pressure port 208 bypasses the precooler 202 and is supplied directly to the ECS pack 100. In one embodiment, a valve 214 is arranged within the conduit 212 adjacent to the inlet 101 of the ECS pack 100. The controller 160 is operably coupled to the valve 214 and is configured to regulate the flow of bleed air into the ECS pack 100.

The controller 160 includes an algorithm configured to determine which pressure port (i.e. the high pressure port 204, intermediate pressure port 206, or low pressure port 208) of each bleed air supply system 200 to open and also what mode to operate a corresponding ECS pack 100 receiving the bleed air supplied from each system 200. The algorithm optimizes the energy of the aircraft as a function of the environmental conditions of the day, the altitude of the aircraft, and the mode of flight (e.g. climb, cruise, descend), the engine operating pressure and a difference in temperature between the supplied bleed air and the demand of the air loads 128. For example, when the temperature of the bleed air is significantly warmer than the temperature demand of the air load 128 for the cabin, the controller 160 is generally configured to operate an ECS pack 100 in the first, normal mode so that the bleed air may be cooled additionally by the ACM. Alternatively, when the temperature of the bleed air is less than or close to the temperature demand of the air load 128, the controller 160 is generally configured to operate an ECS pack 100 in the second, bypass mode. Similarly, the pressure port 204, 206, 208 of each supply system 200 used to provide bleed air may be selected in part based on the pressure required to operate the ACM of a corresponding ECS pack 100.

In some instances, as in conventional aircrafts, the controller 160 may use the same high pressure, intermediate pressure, or low pressure port 204, 206, 208 of each supply system 200 of the aircraft to supply bleed air from a plurality of engines 20 to a plurality of corresponding ECS packs 100. As a result, each of the plurality of ECS packs 100 generally operates in the same first normal mode, or second bypass mode. In another embodiment, the controller 160 may use a first pressure port, such as the intermediate pressure port 206 for example, to supply bleed air from at least one engine 20 to at least one corresponding ECS pack 100 and the controller may use a second pressure port, different from the first pressure port, such as the low pressure port for example, to supply bleed air from another engine 20 to at least another ECS pack 100. In embodiments where the supply systems 200 use different ports, the ECS pack 100 configured to receive bleed air from the first supply system 200 may be configured to operate in either the first normal mode or the second bypass mode. Similarly, the ECS pack 100 configured to receive bleed air from the second supply system 200 may be configured to operate in the same mode, or in a different mode, as the other ECS packs 100.

Inclusion of a low pressure port 208 in the compressor air bleed supply systems 200 and inclusion of bypass valves configured to minimize the flow through the ACM in the ECS pack 100, limit the additional cooling required of the bleed air. The efficiency of the aircraft's environmental control system is improved such that the fuel burn of the aircraft is reduced.

In another embodiment, an aircraft may have an ECS system comprised of two ECS packs 100 driven by each turbine engine 20 including a supply system 200 configured to supply either of the two ECS packs 100 with bleed air from any of the three pressure ports 204, 206, and 208. Controller 160 may configure the supply system 200 to provide bleed air from pressure port 208 of the low spool compressor one of the two ECS packs 100 to run in a bypass mode and provide bleed air from pressure port 204 or 206 of the high spool compressor to run the other of the two ECS packs 100 in a normal mode. When the two ECS packs 100 are running in different modes, the controller is operating the ECS packs asymmetrically. It should be understood that this asymmetrical operation of a plurality of ECS packs can be extended to aircraft with multiple engines each having multiple bleed ports configured to drive the multiple ECS packs in at least two different operating modes. By taking this aircraft system level approach to selecting bleed ports and operating ECS packs in different modes, it is possible to optimize the ECS system to minimize the required bleed air to provide for the needed cabin pressurization and conditioning.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An environmental control system (ECS) pack, comprising:
   a primary heat exchanger;
   a secondary heat exchanger;
   an air cycle machine including a compressor, and a turbine, the compressor being fluidly coupled to an outlet of the primary heat exchanger and an inlet of the secondary heat exchanger and an outlet of the secondary heat exchanger being fluidly coupled to the turbine;
   a first conduit connecting the outlet of the primary heat exchanger and the inlet of the secondary heat exchanger, the first conduit including a first valve;

a second conduit connecting the outlet of the secondary heat exchanger directly to an air load, the second conduit including a second valve; and a third conduit including a third valve, the third conduit and third valve configured to allow for flow from an outlet of the primary heat exchanger directly to the air load, bypassing the air cycle machine.

2. The ECS pack according to claim 1, wherein the ECS pack is configured to operate in either a first normal mode or a second bypass mode.

3. The ECS pack according to claim 2, further comprising a controller operably coupled to at least one of the first valve and the second valve, the controller being configured to move the first valve and the second valve between a closed position and an open position.

4. The ECS pack according to claim 3, wherein when the ECS pack is in the first normal mode, the first valve and the second valve are closed such that bleed air within the ECS pack flows through the air cycle machine.

5. The ECS pack according to claim 4, wherein when the ECS pack is in the second bypass mode, the first valve and the second valve are at least partially open such that a majority of bleed air flowing through the ECS pack bypasses the air cycle machine.

6. The ECS pack according to claim 5, wherein when the ECS pack is in the second bypass mode, a limited portion of bleed air flows through the air cycle machine such that the air cycle machine operates at a minimum speed.

7. The ECS pack according to claim 5, wherein the controller is configured to utilize one or more of engine bleed air pressure or a difference in a temperature of ram air input to the ECS pack and a temperature of the air load to determine whether to operate the ECS pack in the first normal mode or the second bypass mode.

8. An aircraft comprising:
a plurality of engines;
at least two environmental control system (ECS) packs, each ECS pack being configurable to operate in at least two operating modes and including:
a primary heat exchanger;
a secondary heat exchanger;
an air cycle machine including a compressor, and a turbine, the compressor being fluidly coupled to an outlet of the primary heat exchanger and an inlet of the secondary heat exchanger, and an outlet of the secondary heat exchanger being fluidly coupled to the turbine;
a first conduit connecting the outlet of the primary heat exchanger and the inlet of the secondary heat exchanger, the first conduit including a first valve;
a second conduit connecting the outlet of the secondary heat exchanger directly to an air load, the second conduit including a second valve;
a third conduit including a third valve, the third conduit and third valve configured to allow for flow from an outlet of the primary heat exchanger directly to the air load, bypassing the air cycle machine; and
a controller configured to command the at least two environmental control system packs to operate in one of the at least two operating modes.

9. The aircraft of claim 8 wherein the controller commands the at least two environmental control system packs to operate in different operating modes.

10. The aircraft according to claim 8, wherein each ECS pack of the aircraft is configured to operate in either a first normal mode or a second bypass mode.

11. The aircraft according to claim 10, further comprising a controller operably coupled to the first valve and the second valve of each ECS pack, the controller being configured to move the first valve and the second valve between a closed position and an open position.

12. The aircraft according to claim 10, wherein each ECS pack operates in the same first normal mode or second bypass mode.

13. The aircraft according to claim 10, wherein a first ECS pack of the at least two ECS packs operates in the first normal mode and a second ECS pack of the at least two ECS packs operates in the second bypass mode.

14. The aircraft according to claim 10, wherein the controller is configured to utilize one or more of environmental conditions, altitude, mode of flight, engine operating pressure, or a difference in a temperature of the bleed air and a demand of the air load to determine whether to operate each of the plurality of ECS packs in either the first normal mode or the second bypass mode.

* * * * *